(12) United States Patent
Eckstein et al.

(10) Patent No.: US 12,466,347 B2
(45) Date of Patent: Nov. 11, 2025

(54) ACTIVE DISCHARGE OF A VEHICLE INTERMEDIATE CIRCUIT ELEMENT USING A DISCRETE PWM PULSE-GENERATING DISCHARGE CIRCUIT

(71) Applicant: Schaeffler Technologies AG & Co. KG, Herzogenaurach (DE)

(72) Inventors: Daniel Eckstein, Achern (DE); Patrick Augustin, Bühl (DE); Fabian Bögner, Oberkirch (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 96 days.

(21) Appl. No.: 18/563,271

(22) PCT Filed: May 17, 2022

(86) PCT No.: PCT/DE2022/100368
§ 371 (c)(1),
(2) Date: Nov. 21, 2023

(87) PCT Pub. No.: WO2022/262893
PCT Pub. Date: Dec. 22, 2022

(65) Prior Publication Data
US 2024/0217463 A1 Jul. 4, 2024

(30) Foreign Application Priority Data
Jun. 15, 2021 (DE) ................ 10 2021 115 390.5

(51) Int. Cl.
*B60R 16/03* (2006.01)
(52) U.S. Cl.
CPC ................... *B60R 16/03* (2013.01)

(58) Field of Classification Search
CPC .................................................. B60R 16/03
USPC ........................................................ 307/10.1
See application file for complete search history.

(56) References Cited

U.S. PATENT DOCUMENTS

| | | | |
|---|---|---|---|
| 2011/0031939 A1 | 2/2011 | Funaba et al. | |
| 2012/0007551 A1* | 1/2012 | Song | B60L 53/24 320/109 |
| 2012/0056567 A1 | 3/2012 | Savagian et al. | |
| 2021/0257903 A1 | 8/2021 | Edelhäuser et al. | |

FOREIGN PATENT DOCUMENTS

| | | |
|---|---|---|
| CN | 202353452 U | 7/2012 |
| DE | 1177679 B | 9/1964 |
| DE | 102020114204 A1 | 12/2021 |

* cited by examiner

*Primary Examiner* — Michael R. Fin
(74) *Attorney, Agent, or Firm* — Volpe Koenig

(57) ABSTRACT

An active discharge circuit for a vehicle discharge device; for discharging a vehicle intermediate circuit, includes a connector for connection to an intermediate circuit element of the vehicle intermediate circuit; a circuit arrangement parallel-connected to the connector and having at discharge element and at switching element, the switching element being designed to electrically contact the discharge element to the connector in a closed switching state and not to electrically contact the discharge element to the connector in an open switching state; and a discrete discharge circuit being designed to adjust the switching states in the switching element by pulse width modulation during discharging of the at least one intermediate circuit element.

18 Claims, 5 Drawing Sheets

ACTIVE DISCHARGE OF A VEHICLE INTERMEDIATE CIRCUIT ELEMENT USING A DISCRETE PWM PULSE-GENERATING DISCHARGE CIRCUIT

CROSS-REFERENCE TO RELATED APPLICATIONS

This application is the U.S. National Phase of PCT Appln. No. PCT/DE2022/100368 filed May 17, 2022, which claims priority to DE 102021115390.5 filed Jun. 15, 2021, the entire disclosures of which are incorporated by reference herein.

TECHNICAL FIELD

The present disclosure relates to an active discharge circuit for a vehicle discharge device, for discharging a vehicle intermediate circuit.

In addition, the present disclosure relates to a method for actively discharging a vehicle intermediate circuit, with an active discharge circuit for a vehicle discharge device.

BACKGROUND

Hybrid or electric vehicles, in which voltages greater than 60 V are provided in the drive system, must be actively discharged in a short time for safety reasons, in order to avoid a danger to persons from dangerous electrical voltages during maintenance or accidents. This involves discharging the intermediate circuit capacitors in the power electronics of the vehicle, which are needed as fast energy storage for the operation of pulse inverters.

According to the prior art, active discharge circuits use one or more resistors which are switched on in parallel with an intermediate circuit capacitor by means of semiconductor switches in order to discharge the intermediate circuit capacity. During the discharge process, the vehicle drive is disconnected from the battery system, i.e., a battery contactor is in an open switching state so that the intermediate circuit capacity cannot be recharged by the battery system. A battery contactor is a switch used to protect the battery. The switch can be operated electrically or mechanically or with a combination of these methods.

During discharge, the voltage of the intermediate circuit capacity decreases continuously until it reaches a non-critical value, e.g., a value of less than 60 V, and the discharge circuit is deactivated again.

SUMMARY

The present disclosure, according to an exemplary embodiment, provides an improved active discharge of an intermediate circuit element. In particular, the discharge element(s) should be able to be dimensioned smaller for the same discharge time without heating up too much during a discharge, wherein at the same time the intermediate circuit should be discharged safely in every fault case.

One aspect relates to an active discharge circuit for a vehicle discharge device, for discharging a vehicle intermediate circuit. The discharge circuit comprises: a connector for connection to at least one intermediate circuit element of the vehicle intermediate circuit; a circuit arrangement connected in parallel to the connector and having at least one discharge element and at least one switching element, wherein the at least one switching element is designed to electrically contact the discharge element to the connector in a closed switching state and not to electrically contact the discharge element to the connector in an open switching state; and a discrete discharge circuit, wherein the discrete discharge circuit is designed to adjust the switching states in the switching element by pulse-width modulation (PWM) during discharging of the at least one intermediate circuit element.

One aspect relates to a method for actively discharging a vehicle intermediate circuit, with the active discharge circuit for a vehicle discharge device. Here, the at least one switching element operates between two switching states as follows:

in a closed switching state, it electrically contacts the discharge element to the connector; and in an open switching state, it does not electrically contact the discharge element to the connector.

The discrete discharge circuit adjusts the switching states in the switching element by PWM during discharge of the at least one intermediate circuit element.

An advantageous basic idea of the present disclosure and individual aspects of the claimed subject matter of the embodiments are explained below, and preferred modified embodiments are described further below. Explanations, in particular regarding advantages and definitions of features, are basically descriptive and preferred, but not limiting, examples. If an explanation is limiting, this is expressly mentioned. In this regard, the method can be designed and further developed as described below on the basis of the active discharge device.

An advantageous basic idea is therefore to control the discharge process in a pulse-width modulated manner. Pulse-width modulation (PWM) is also referred to as pulse-duration modulation (PDM) or pulse-length modulation (PLM). PWM is a digital modulation type in which a technical variable, e.g., the electrical voltage, alternates between two values. In this process, a rectangular pulse is modulated at a constant frequency, the width or length of which varies. The ratio between pulse and pause is referred to as the duty cycle or duty factor. With PWM, the modulated signal has a fixed amplitude. In return, the pulse duration depends on the amplitude of the information signal. The more positive the information signal, the longer the pulse lasts. The more negative the information signal, the shorter the pulse.

For the pulse-width modulated control of the switching element, for example, circuits can be used which switch periodically between two states. This switching should be feasible without external excitation. In addition, the periodically switching circuit should generate periodic discharge curves, which is possible, for example, using a capacitor that is discharged at low resistance via a first diode and charged at high resistance via a second diode.

The PWM-controlled switching element is designed to electrically contact the discharge element to the connector of the intermediate circuit in a closed switching state. The intermediate circuit, e.g., as part of a vehicle, electrically couples several electrical networks on an intermediate current or voltage level via converters as energy storage. For example, the vehicle intermediate circuit can be a circuit arrangement with a capacitor as the intermediate circuit element, which supplies power to a motor. The capacitor can in turn be powered by a battery. The capacitor can be used to supply the motor with additional energy for a short time, e.g., when starting to move. Conversely, the intermediate circuit with its circuit arrangement can smooth voltage peaks occurring during motor operation, e.g., caused by a braking process. In the open switching state, an electrical contact is canceled or interrupted.

The power occurring during discharge can be evenly distributed over an entire discharge duration by the pulse-width modulating circuit. Accordingly, a linear reduction of the energy in the intermediate circuit capacitor occurs. Here, it can advantageously be achieved that the discharge element(s) heat up only half as much in the discharge circuit as in discharge circuits according to the prior art. One or more resistors can be used for discharging. The resistors can be designed to be smaller than in solutions according to the prior art, making the solution more cost effective. In other words, cost savings can be achieved due to smaller sizing and/or the use of fewer discharge elements. Alternatively or in addition, a lower cost model of discharge element(s) can be used for large power resistors.

The discharge circuit is a discrete discharge circuit. In other words, the discharge circuit has the attribute "discrete". "Discrete" means that the discharge circuit has discrete components. Discrete components are individual components such as diodes, resistors or coils. In any case, the components of the discrete discharge circuit are not integrated circuits such as microprocessor chips, which can have a large number of transistors. Accordingly, the components of the discrete discharge circuit are not components which have an electronic circuit applied to a semiconductor material.

Advantageously, the control for discharging is handled without active control of a control element, such as a microcontroller. The discrete discharge circuit according to the present disclosure has the advantage over a software-based discharge that failure of the active discharge cannot occur if the microprocessor, which is software-controlled, fails. This is important because the active discharge of the intermediate circuit is a safety-relevant function for the protection of persons in the event of a fault. This is a high-voltage safety function. The term "high-voltage", in short: "HV", refers to systems that operate on AC voltages in a range of 30 V to 1 kV or DC voltages above 60 V to 1.5 kV. Thus, this is an embodiment for measuring a voltage that can be implemented at low cost, since, for example, HV voltage measuring elements may already be installed on the vehicle for other purposes. By means of this implementation in a discrete circuit, availability is increased in addition to safety.

According to embodiments, the discrete discharge circuit can be designed to adjust the switching states at the at least one switching element as a function of an intermediate circuit voltage at the at least one intermediate circuit element by PWM, wherein the discrete discharge circuit is designed to generate a wave-shaped sawtooth voltage, to compare it with the intermediate circuit voltage, and to output a PWM pulse to the switching element until the wave-shaped sawtooth voltage falls below the intermediate circuit voltage.

Furthermore, the embodiment described above may include that the discharge circuit is designed to compare the wave-shaped sawtooth voltage with the intermediate circuit voltage and, as soon as the wave-shaped sawtooth voltage is greater than the intermediate circuit voltage, to output the PWM pulse to the switching element. Then the PWM pulse is output to the switching element until the wave-shaped sawtooth voltage falls below the intermediate circuit voltage.

The intermediate circuit voltage can be used to measure how much power would be applied to the power circuit, in particular its discharge element(s). A pulse-width modulated control of the switching element(s) can be a cost-effective solution for control in the discharge circuit. The wave-shaped sawtooth voltage, also referred to as non-linear so-called "wave sawtooth" voltage, is used for PWM generation instead of an ordinary comparison of sine and triangle voltage for PWM generation. The wave-shaped sawtooth voltage is an AC voltage with a waveform of a sawtooth, which is a periodic and non-sinusoidal oscillation.

When comparing with the measured intermediate circuit voltage, the required PWM pattern is generated. In this regard, a duty cycle of the PWM at a higher intermediate circuit voltage is lower than a duty cycle of the PWM at a lower intermediate circuit voltage. A duty cycle of the PWM defines a ratio between an on-time and an off-time of the switching element. Thus, advantageously, at even higher voltages at an intermediate circuit element, such as an intermediate circuit capacity, less power can be applied to the discharge element compared with known solutions, and as the discharge duration progresses and the voltage at the intermediate circuit capacity drops as a result, comparatively more power can be applied to the discharge element compared with known solutions. Overall, this can result in an evenly distributed application of power from the intermediate circuit element(s) to the discharge element(s) over the discharge duration.

This PWM pattern ensures an equal distribution of energy over the discharge period at the discharge resistor. This results in a significantly lower temperature load on the resistor compared to the prior art.

Another embodiment can be such that the wave-shaped sawtooth voltage has a waveform of a sawtooth, wherein the sawtooth wave periodically rises instantaneously from an initial value to a maximum value and subsequently decreases to the initial value in the form of an e-function. In other words, the discrete discharge circuit can be designed to generate the wave-shaped sawtooth voltage with a waveform of a sawtooth, wherein the sawtooth wave periodically rises instantaneously from an initial value to a maximum value and subsequently decreases to the initial value in the form of an e-function. In this regard, the duty cycle of the PWM can be adjusted in such a way that during discharge a temperature increase at the at least one discharge element behaves akin to a saturation function dependent on a discharge time. The advantageous sawtooth voltage prefers in a particularly advantageous manner that a PWM pattern is generated, which ensures a particularly optimal uniform distribution of energy over the discharge period.

According to embodiments, the discrete discharge circuit can have a plurality of sub-circuits connected in series, of which a first sub-circuit is an astable multivibrator, and of which a second sub-circuit connected downstream of the first sub-circuit is a charging circuit for charging and discharging a capacitor, wherein the multivibrator is designed to output voltage pulses as an output signal, and wherein the second sub-circuit is designed to output the wave-shaped sawtooth voltage with periodic discharge curves as an output signal.

An astable multivibrator is also referred to as an astable flip-flop. Astable flip-flops consist of two electronic switches that are mutually connected in such a way that a positive feedback occurs, which brings the two switches into opposing states. In this regard, one of the switches is closed while the other switch is open. Timing elements are used to dissipate the respective electrical voltage that caused the positive feedback. After a delay, the initial state changes. Subsequently, the initial state changes again after another delay time. The change between the two states occurs periodically. A frequency of the change between the two states results from the delay times.

For example, the charging circuit has at least two diodes and a capacitor. The capacitor is discharged with low resistance via a first diode of the charging circuit and charged with high resistance via a second diode of the charging circuit. Optionally, additional modules can be used to adjust a slope of the charging curve. Already with the capacitor of the charging circuit, however, a slope of the charging curve can be adjusted. Optionally, one or more resistors can be provided, which is/are connected in series with the diode that discharges the capacitor.

The embodiment described above favors a very low-cost design of the discharge circuit with components that are readily available.

Another embodiment can be that the astable multivibrator is designed to generate voltage pulses with an adjustable frequency. The voltage pulses may be such that a capacitor used in the second sub-circuit is rapidly charged. Furthermore, the frequency of the astable multivibrator may be adjusted via a capacitor which is connected in series with a resistor. The further developed embodiment described above also favors a very low-cost design of the discharge circuit with components that are readily available.

A third sub-circuit connected downstream of the second sub-circuit can be a non-inverting amplifier. The non-inverting amplifier has the advantage that the generated sawtooth voltage is adjusted to a level of the measuring signal. Thus, it is advantageous that the measuring signal does not have to be modified, which means that, for example, interference signals contained in the measuring signal are not amplified.

According to embodiments, the active discharge circuit can have a measuring element for measuring the intermediate circuit voltage at the intermediate circuit element and for outputting an intermediate circuit voltage measuring signal to the discrete discharge circuit, wherein a fourth sub-circuit connected downstream of the second sub-circuit or downstream of the third sub-circuit is a comparator circuit, wherein the comparator circuit is designed to compare the wave-shaped sawtooth voltage with the intermediate circuit voltage measuring signal and, as soon as the sawtooth voltage is greater than the intermediate circuit voltage measuring signal, to output a PWM pulse to the switching element. With this embodiment, a length of a high time of the PWM signal output to the switch can advantageously be extended as a function of an intermediate circuit voltage. In particular, the comparator circuit is designed to adjust the high time of the PWM pulse or the PWM signal antiproportionally to the intermediate circuit voltage. Thus, a longer discharge per PWM pulse occurs at lower intermediate circuit voltage values, which in turn favors the discharge resistor(s) heating up less.

Furthermore, the embodiment described above may include that the comparator circuit of the discrete discharge circuit is designed to compare the wave-shaped sawtooth voltage with the intermediate circuit voltage measuring signal and to output a PWM pulse to the switching element as soon as the sawtooth voltage is greater than the intermediate circuit voltage measuring signal and until the wave-shaped sawtooth voltage falls below the intermediate circuit voltage measuring signal.

For example, the measuring element can be designed to measure a high-voltage (HV) voltage at the intermediate circuit element and to output a HV measuring signal of the intermediate circuit voltage to the control unit. This embodiment for measuring a voltage can be implemented at low cost, since, for example, HV voltage measuring elements may already be installed on the vehicle for other purposes.

The active discharge circuit can have a control unit in addition to the discrete charging circuit, wherein the control unit is designed to adjust the switching states at the at least one switching element by PWM during discharging of the at least one intermediate circuit element as a function of the intermediate circuit voltage at the at least one intermediate circuit element. In this case, the control unit could be designed to output a PWM signal to the switching element in a similar form to the discrete discharge circuit. This would create a redundant design.

According to embodiments, the first sub-circuit can be designed to output a square wave voltage having a high time and a low time to the second sub-circuit, wherein the first sub-circuit has a capacity connected to a connection point of a voltage source of the first sub-circuit and a resistor connected in series with the capacity, and wherein the capacity and the resistor are designed and connected such that the high time comprises a time interval in a range from $\frac{1}{6}$ to $\frac{1}{8}$ of a time interval of the low time. Thus, the output signal of the first sub-circuit is advantageously a signal that can be modified very flexibly in the low time in downstream sub-circuits.

Furthermore, the second sub-circuit can have two resistors, a diode connected in the reverse direction, a diode connected in the forward direction and a capacitor, wherein a resistor and a diode are each connected in a series circuit, and both series circuits of resistor and diode are connected in parallel, and wherein the resistor connected upstream of the diode connected in the reverse direction and the capacitor are designed to adjust a slope of the respective discharge curve of the output signal formed as a wave-shaped sawtooth voltage. This is a simple and inexpensive design made up of readily available components. In addition, the circuit requires little maintenance due to the small number of components.

BRIEF DESCRIPTION OF THE DRAWINGS

In the following, the present disclosure is explained by way of example with reference to the accompanying drawings using preferred exemplary embodiments, wherein the features presented below can present an aspect of the present disclosure both individually and in combination. In the figures.

DETAILED DESCRIPTION

Figure 1:
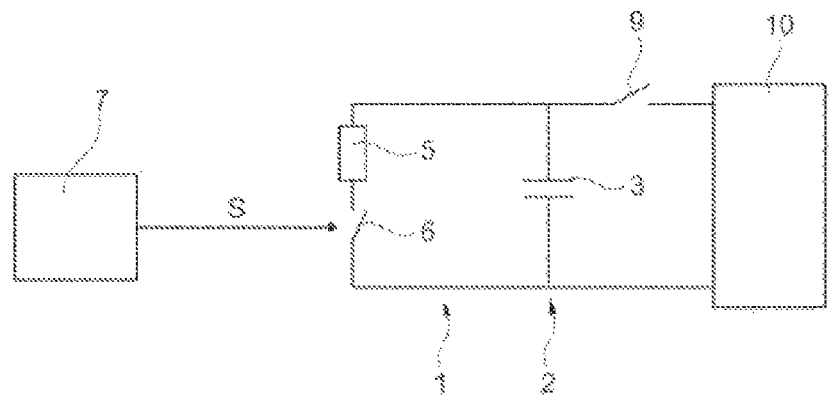
FIG. 1: shows an arrangement with an active discharge circuit according to the prior art.

FIG. 1 shows an arrangement with an active discharge circuit according to the prior art. The arrangement comprises an active discharge circuit 1 for a vehicle discharge device for discharging a vehicle intermediate circuit 2.

The discharge circuit 1 has a connector for connection to an intermediate circuit element 3 of the vehicle intermediate circuit 2, and a circuit arrangement connected in parallel to the connector and having a discharge element 5 and a switching element 6, wherein the switching element 6 is designed to electrically contact the discharge element 5 to the connector in a closed switching state and not to electrically contact the discharge element 5 to the connector in an open switching state. The arrangement further comprises a battery contactor 9 which disconnects a high-voltage battery 10 from the intermediate circuit element 3 during discharge of the intermediate circuit element 3. A battery contactor is a switch used to protect the battery. The switch can be operated electrically or mechanically or with a combination of these methods. With a contactor, for example, switching operations are possible remotely via control lines with a small conductor cross-section. Contactors are available for different mounting types, for example for DIN rail mounting, mounting plates or in housings with holes for individual mounting.

Furthermore, the arrangement comprises a control unit 7 which controls the switching element 6 with a control signal S and thus causes it to switch between the two aforementioned switching states.

Figure 2:
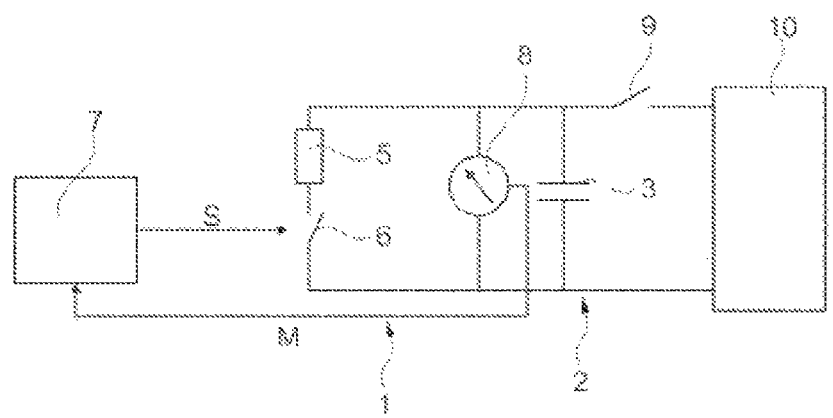
FIG. 2: shows an arrangement with an active discharge circuit with a control unit outputting PWM signals.

FIG. 2 shows an arrangement with an active discharge circuit. The arrangement of FIG. 2 comprises the elements of the arrangement of FIG. 1. The intermediate circuit element 3 is an intermediate circuit capacity, i.e., it behaves akin to a capacitor. The switching element 6 is a semiconductor switch. In the arrangement of FIG. 2, the control unit 7 is designed to adjust the switching states at the switching element 6 by PWM during discharging of the intermediate circuit element 3. The control unit 7 outputs control signals S to the switching element 6 for this purpose.

The control unit 7 is designed to adjust a duty cycle (d) of the PWM according to the following ratio $$d = R \cdot P_{max}/V(t)^2.$$

In other words, the control unit 7 is designed to adjust the duty cycle (d) of the PWM as a function of a discharge resistance value (R) of the discharge element 5, a maximum power ($P_{max}$) of the intermediate circuit element 3, and the intermediate circuit voltage (V(t)). Here, the maximum power ($P_{max}$)) of the intermediate circuit element 3 is defined according to the following ratio $$P_{max} = E_{max}/t_E = (0.5 \cdot C \cdot V_{max}^2)/t_E,$$

wherein C is an intermediate circuit capacity of the intermediate circuit element 3, $V_{max}$ is a maximum intermediate circuit voltage of the intermediate circuit element 3, $E_{max}$ is a maximum energy of the intermediate circuit element, and $t_E$ is a maximum discharge time of the intermediate circuit element 3.

In addition to the elements and units of the arrangement of FIG. 1, the arrangement of FIG. 2 has a measuring element 8. The measuring element 8 is designed to measure a high voltage (HV) at the intermediate circuit element 3 and to output a HV measuring signal M of the intermediate circuit voltage V(t) (see FIGS. 7 and 9) to the control unit 7.

Figure 3:
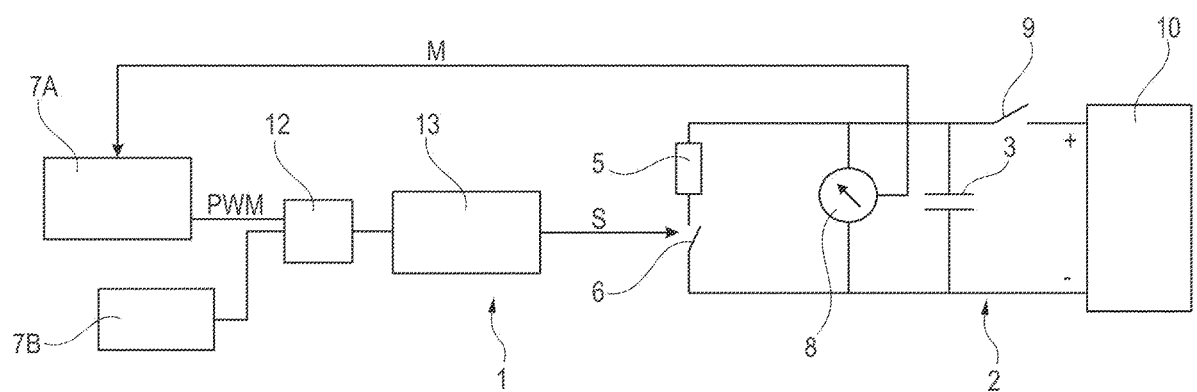
FIG. 3: shows a simplified arrangement with an active discharge circuit with a discrete discharge circuit for outputting PWM signals.
Figure 5:
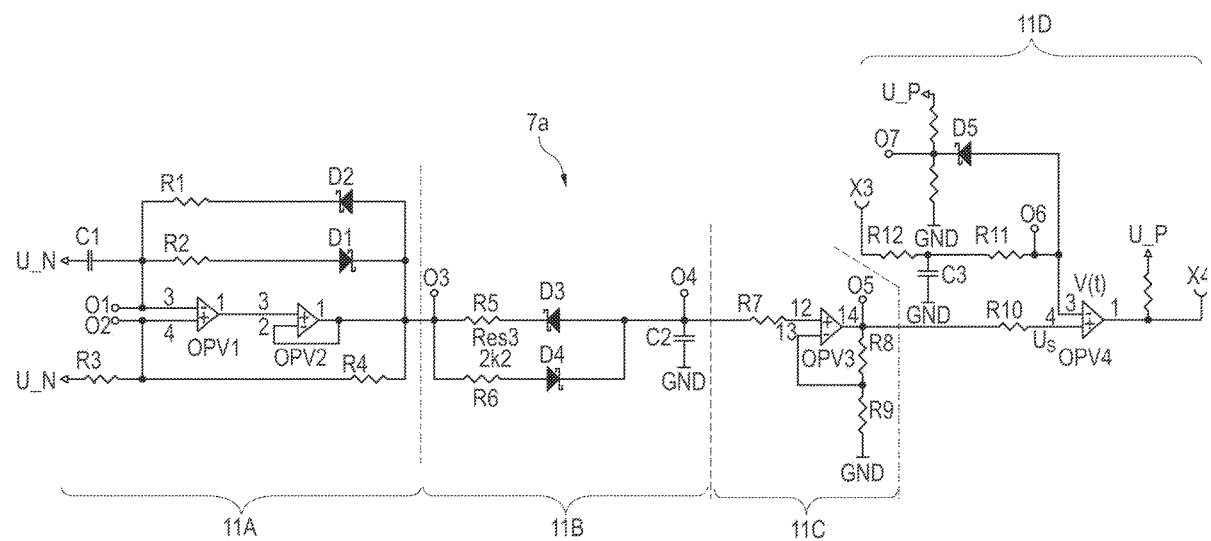
FIG. 5: shows an arrangement of an active discharge circuit with a discrete discharge circuit for outputting PWM signals.

FIG. 3 shows an arrangement with an active discharge circuit 1 with a module 7A, which has the discrete discharge circuit 7a (see FIG. 5). The arrangement is shown in a simplified manner and serves to illustrate the interfaces. The module 7A of FIG. 3 has the discrete discharge circuit 7a, which generates a PWM signal. In parallel with the discrete discharge circuit 7a, a control unit of the module 7B generates a discharge signal. The control unit can be the control unit 7 of the exemplary embodiment of FIG. 2. The control unit can control the discrete discharge circuit 7a such that the discrete discharge circuit 7a outputs a PWM signal. In this regard, the discrete discharge circuit 7a is designed to adjust the duty cycle d of the PWM according to the same ratio as the control unit 7 of the embodiment of FIG. 2.

To control the discrete discharge circuit 7a, the control unit of FIG. 3 generates a discharge signal. The discrete discharge circuit 7a is designed to be permanently active in the event that the control unit fails. In other words, if the control unit fails, the discrete discharge circuit 7a outputs a PWM signal to the module 12 without the need for control on the part of the control unit.

The module 12 receives the discharge signal and the PWM signal. When both signals have been received, or at least the PWM signal has been received, the module 12 passes the PWM signal on to the module 13. The module 13 has a driver stage. The driver stage in turn outputs the control signal S to the semiconductor switch 6.

Alternatively or in addition, in the embodiment of FIG. 3, the control unit can be designed like the control unit 7 of the exemplary embodiment of FIG. 2. In this case, the control unit 7 can output a PWM signal to the module 12, and the discharge circuit 7a of the module 7A can output a PWM signal to the module 12. In other words, a redundant design is provided.

FIG. 5 shows an arrangement of an active discharge circuit 1 with a discrete discharge circuit 7a. The discrete discharge circuit 7a can switch in the same manner as the discrete discharge circuit 7a of the embodiment of FIG. 3.

FIG. 5 shows a circuit diagram with the sub-circuits 11A, 11B, 11C and 11D. One possible embodiment of the sub-circuits 11A to 11D is shown here in each case. The sub-circuits 11A to 11D together generate a wave-shaped sawtooth voltage $U_S$ as an output signal S, which is output to the switch 6. The wave-shaped sawtooth voltage $U_S$ has a waveform of a sawtooth, wherein the sawtooth wave periodically rises instantaneously from an initial value to a maximum value and subsequently decreases to the initial value in the form of an e-function. The sub-circuits 11A to 11D are connected in series.

The sub-circuit 11A is an astable multivibrator which outputs a pulsed voltage as the output signal. The pulsed voltage or the voltage pulses are generated by the astable multivibrator with an adjustable frequency. The output signal is a square wave voltage with a high time and a low time.

Here, the components "first resistor R1" and "first capacity component C1" are used to adjust the high time of the output signal. In other words, a length of the high time is adjusted. In addition, the second resistor R2 and the first capacity component C1 are used to adjust a low time of the output signal.

The first capacity component C1 connects to a connection point $U_N$ of a voltage source of the first sub-circuit 11A. The first capacity component C1 is therefore connected in series with the connection point $U_N$ of the voltage source. The first resistor R1 is connected in series with the first capacity component C1. The first capacity component C1 and the first resistor R1 are designed and connected such that the high time comprises a time interval in a range from ⅙ to ⅛ of a time interval of the low time.

In the first sub-circuit 11A, the first resistor R1 and a second diode D2 are connected in series in the reverse direction. Furthermore, a second resistor R2 and a first diode D1 are connected in series in the forward direction. The second diode D2 and the first resistor R1 are, in turn, connected in parallel with the first diode D1 and the second resistor R2. The first resistor R1 is provided in the first sub-circuit 11A for protecting an operational amplifier OP1, OP2 of the first sub-circuit 11A. The first sub-circuit 11A has two operational amplifiers OPV1 and OPV2 connected in series. Furthermore, a third and fourth resistor R3 and R4 are also provided in the first sub-circuit 11A.

The first sub-circuit 11A is connected in series with the second sub-circuit 11B, and the second sub-circuit 11B receives the output signal of the first sub-circuit 11A. The second sub-circuit 11B is a charging circuit for charging and discharging a second capacity component C2, which is a capacitor. The second sub-circuit 11B is configured to output the wave-shaped sawtooth voltage $U_S$ as an output signal. In addition to the second capacity component C2, the second sub-circuit 11B has a fifth resistor R5, a sixth resistor R6, a third diode D3, and a fourth diode D4.

The fifth resistor R5 is connected in series with the third diode D3 in the reverse direction. The sixth resistor R6 is connected in series with the fourth diode D4 in the forward direction. The fifth resistor R5 and the third diode D3 and the sixth resistor R6 and the fourth diode D4 are, in turn, connected in parallel. The parallel circuit of diodes D3, D4 and resistors R5, R6 is, in turn, connected in series with the second capacity component C2. The capacitor representing the second capacity component C2 is charged or discharged via the two diodes D3, D4. Here, the capacitor is charged via the fourth diode D4 and the capacitor is discharged via the third diode D3. Charging is done with low resistance and discharging is done with high resistance. The discharging and charging result in a voltage of strung together discharge curves. Via the fifth resistor R5 and the capacitor, a slope of a respective discharge curve of the output signal output as a wave-shaped sawtooth voltage $U_S$ is adjusted.

The third sub-circuit 11C is connected downstream of the second sub-circuit 11B. The third sub-circuit 11C receives the output signal of the second sub-circuit 11B. The third sub-circuit 11C is a non-inverting amplifier. The amplifier is designed to adjust the output signal of the second sub-circuit 11B to a level of the measured intermediate circuit voltage V(t). Accordingly, such an amplifier is required in the case where the intermediate circuit voltage V(t) is a multiple of the output signal of the second sub-circuit 11B or vice versa. For example, the intermediate circuit voltage V(t), which has a value of 920 V to 0 V, can be represented in a range from 0 V to 5 V in the present case. In this range, the output signal of the second sub-circuit 11B would then also have to be adjusted by the amplifier. The third sub-circuit 11C has a seventh resistor R7, an eighth resistor R8, and a ninth resistor R9. Furthermore, the third sub-circuit 11C has a third operational amplifier OPV3. A gain factor is adjusted via the eighth and ninth resistor R8 and R9.

A fourth sub-circuit 11D is connected to the third sub-circuit 11C. The fourth sub-circuit 11D receives the amplified signal of the wave-shaped sawtooth voltage $U_S$ from the third sub-circuit 11C.

As already described with reference to FIG. 2, the active discharge circuit 1 has a measuring element 8. The measuring element 8 is designed to measure the intermediate circuit voltage V(t) at the intermediate circuit element 3 and to output an intermediate circuit voltage measuring signal M to the discrete discharge circuit 7a. The fourth sub-circuit 11D is a comparator circuit which is designed to compare the wave-shaped sawtooth voltage $U_S$ with the intermediate circuit voltage measuring signal M and, as soon as the sawtooth voltage $U_S$ is greater than the intermediate circuit voltage measuring signal M, to output a PWM pulse to the switching element 6. The two voltages are compared in a comparator, which is the operational amplifier OPV4. As soon as the sawtooth voltage $U_S$ is greater than the intermediate circuit voltage measuring signal M, the operational amplifier OPV4 draws its output to the voltage source $U_P$, which is part of the fourth sub-circuit 11D. Otherwise the operational amplifier outputs 0 V.

The fourth sub-circuit 11D comprises a tenth resistor R10, an eleventh resistor R11, and a twelfth resistor R12. Furthermore, the fourth sub-circuit 11D comprises a fifth diode D5, a third capacity component C3, and the fourth operational amplifier OPV4.

Figure 4:
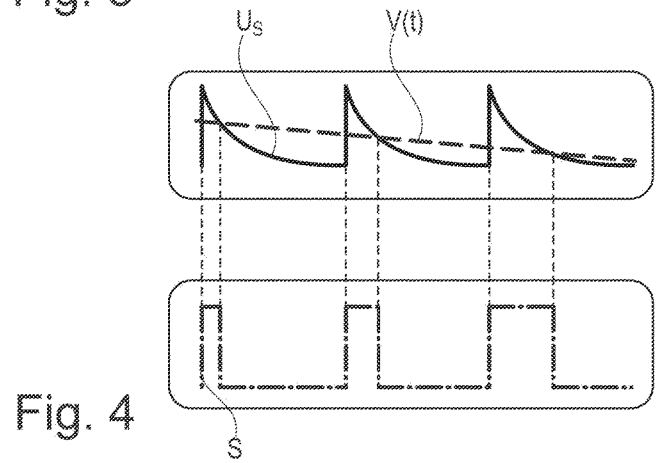
FIG. 4: shows a course over time of a wave-shaped sawtooth voltage, an intermediate circuit voltage and a PWM signal.

FIG. 4 shows a course over time of a wave-shaped sawtooth voltage $U_S$, an intermediate circuit voltage V(t) and a PWM signal. The comparison operation of the comparator when comparing the sawtooth voltage $U_S$ with the measured intermediate circuit voltage V(t) can be reproduced on the basis of the course over time. The measured intermediate circuit voltage V(t) is then applied to the comparator via the resistor R12 (see FIG. 5). The comparator then generates the PWM signal S, which is used to control the switch 6 (see FIG. 3). The length of a high time of the PWM signal S then results from a time interval within which a value of the sawtooth voltage $U_S$ is above a value of the intermediate circuit voltage V(t). Here, a high time of the PWM signal S lengthens with decreasing intermediate circuit voltage V(t).

Figure 6:
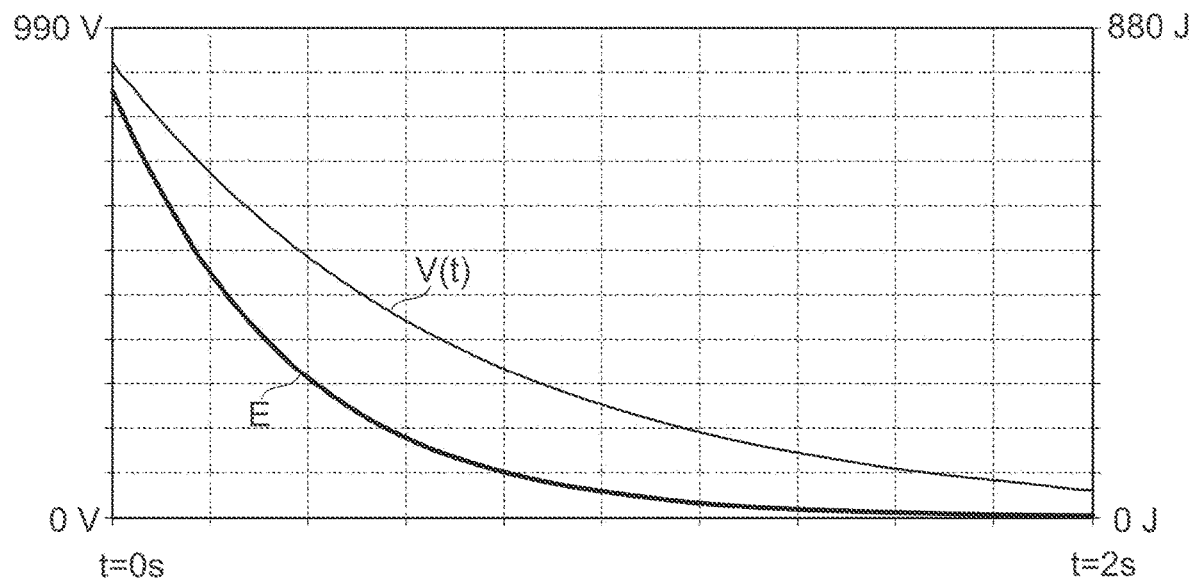
FIG. 6: shows a course over time of an energy of an intermediate circuit element and an intermediate circuit voltage in the arrangement according to FIG. 1.

FIG. 6 shows a course over time of an energy E of an intermediate circuit element 3 and an intermediate circuit voltage V(t) (see also FIG. 8) in the arrangement according to FIG. 1. Accordingly, the time t for discharging the intermediate circuit element 3 is plotted on the X-axis, values of the intermediate circuit voltage V(t) are plotted on the left Y-axis and values of the energy E of the intermediate circuit element 3 are plotted on the right Y-axis. The courses over time of both values show a highest value at the beginning of the discharge at a point in time t=0) and decrease continuously during a further discharge of the intermediate circuit element 3. Here, a rate of decrease in the energy E and intermediate circuit voltage V(t) is highest at the beginning of the discharge and decreases as the discharge duration progresses. Accordingly, a very high discharge current occurs at the start of the discharge at a point in time t=0), which continuously decreases as the discharge process progresses. Furthermore, while a high discharge current occurs, a high intermediate circuit voltage V(t) is also applied to the discharge element 5. Both lead to heating of the discharge element 5, which is explained in more detail with reference to FIG. 8.

Figure 7:
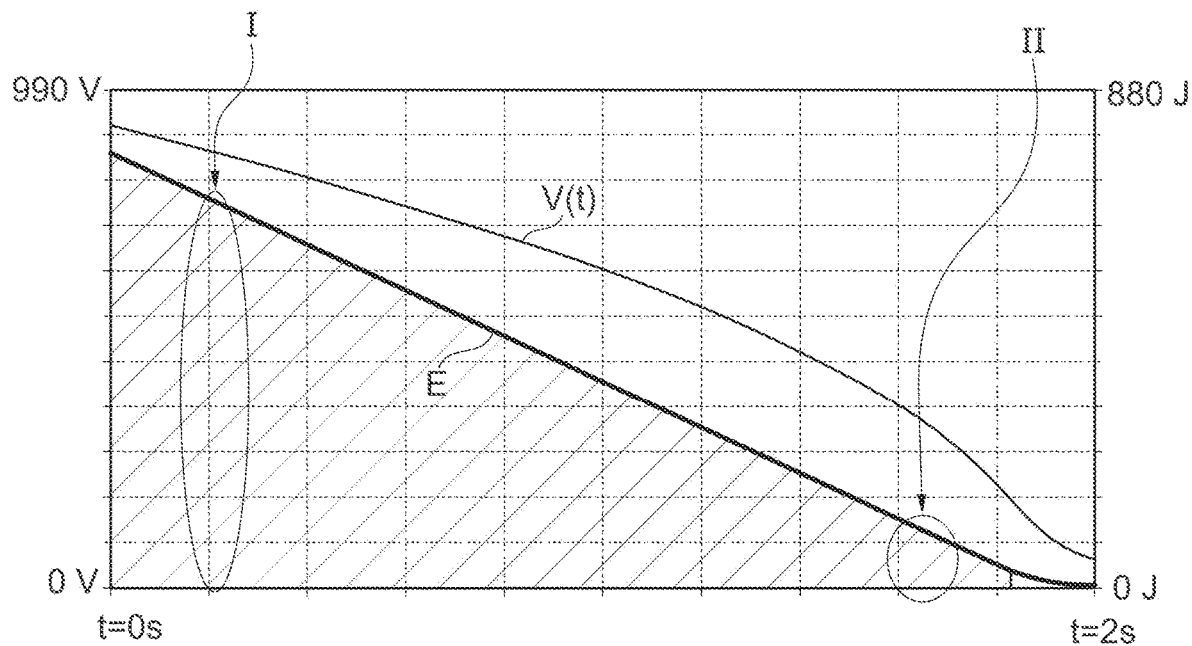
FIG. 7: shows a course over time of an energy of an intermediate circuit element and an intermediate circuit voltage in the arrangements according to FIGS. 2 to 3 and 5.

FIG. 7 shows a course over time of an energy E of an intermediate circuit element and an intermediate circuit voltage V(t) in the arrangements according to FIGS. 2 to 3 and 5. The time t is plotted on the X-axis, values of the intermediate circuit voltage V(t) are plotted on the left Y-axis and values of the energy E of the intermediate circuit element 3 are plotted on the right Y-axis. At a point in time t=0, the energy of the intermediate circuit element 3 and the intermediate circuit voltage V(t) are at their highest. Accordingly, a lower duty cycle is selected in a first time period, exemplarily marked and provided with a reference sign I, in order to control the switching element 6 in a pulse-width modulated manner. In a second time period, exemplarily marked and provided with a reference sign II, a higher duty cycle is selected in order to control the switching element 6 in a pulse-width modulated manner. The energy E of the intermediate circuit element 3 decreases for the most part linearly and thus uniformly in the arrangements of FIGS. 2 to 3 and 5. The intermediate circuit voltage V(t) also decreases more uniformly in the arrangements of FIGS. 2 to 3 and 5 than in the arrangement of FIG. 1.

Figure 8:
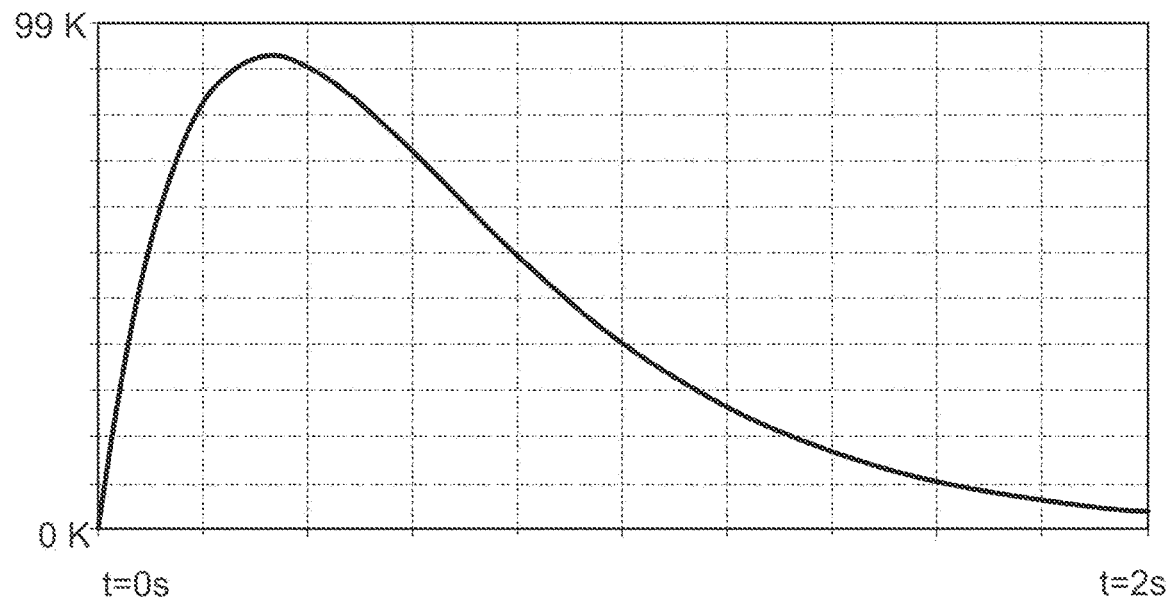
FIG. 8: shows a course over time of a temperature, displayed in voltage values, in the arrangement according to FIG. 1.

FIG. 8 shows a course over time of a temperature T of the discharge element 5, displayed in voltage values, in the arrangement according to FIG. 1. Accordingly, a time t of discharge is plotted on the X-axis and voltage values corresponding to a temperature of the discharge element 5 used in the arrangement of FIG. 1 are plotted on the Y-axis. It can be seen that a maximum temperature value is reached at the discharge element 5 in a time window between 0.2 s and 0.4 s of a discharge time t, which subsequently decreases as the discharge time t progresses. Here, a temperature difference between the maximum temperature value and a lowest temperature value at the beginning of the discharge time is 93 Kelvin.

Figure 9:
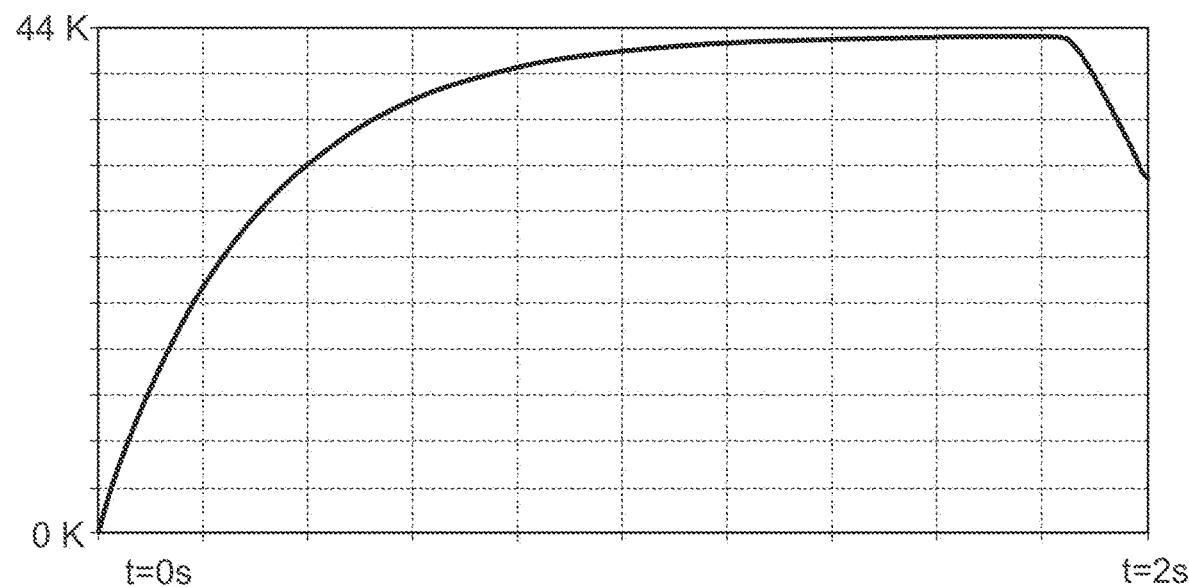
FIG. 9: shows a course over time of a temperature, displayed in voltage values, in the arrangements according to FIGS. 2 to 3 and 5.

FIG. 9 shows a course over time of a temperature T of the discharge element 5, displayed in voltage values, in the arrangements according to FIGS. 2 to 3 and 5. Accordingly, a time t of discharge is plotted on the X-axis and voltage values corresponding to a temperature of the discharge element 5 used in the arrangements of FIGS. 2 to 3 and 5 are plotted on the Y-axis. It can be seen that a maximum temperature value is reached at the discharge element 5 in a time window between 1 s and 1.8 s of a discharge time t, which subsequently decreases as the discharge time t progresses. Here, a temperature difference between the maximum temperature value and a lowest temperature value at the beginning of the discharge time is 43 Kelvin. In a period between 1.8 s and 2 s of the discharge time t, the temperature of the discharge element 5 decreases. The temperature increase at the discharge element 5, which is a discharge resistor, is hereby substantially lower in the arrangements of FIGS. 2 to 3 and 5 than in an arrangement according to FIG. 1.

LIST OF REFERENCE SIGNS

1 Active discharge circuit
2 Vehicle intermediate circuit
3 Intermediate circuit element
5 Discharge element
6 Switching element
7 Control unit
7a Discrete discharge circuit
7A Module for generating a PWM signal via discrete discharge circuit
7B Module for generating a discharge signal
8 Measuring element
9 Battery contactor
10 High-voltage battery
11A First sub-circuit
11B Second sub-circuit
11C Third sub-circuit
11D Fourth sub-circuit
12 Reception of PWM signal and discharge signal
13 Driver stage
I First period of discharge time with a low PWM duty cycle
II Second period of discharge time with a high PWM duty cycle
C Intermediate circuit capacity of the intermediate circuit element
C1 First capacity component
C2 Second capacity component
C3 Third capacity component
d Duty cycle
D1 First diode
D2 Second diode
D3 Third diode
D4 Fourth diode
D5 Fifth diode
E Energy of the intermediate circuit element
$E_{max}$ Maximum energy of the intermediate circuit element
M Measuring signal
OPV1 First operational amplifier
OPV2 Second operational amplifier
OPV3 Third operational amplifier
OPV4 Fourth operational amplifier
PWM Pulse-width modulation
$P_{max}$ Maximum power of the intermediate circuit element
R Discharge resistance value of the discharge element
R1 First resistor
R2 Second resistor
R3 Third resistor
R4 Fourth resistor
R5 Fifth resistor
R6 Sixth resistor
R7 Seventh resistor
R8 Sixth resistor
R9 Seventh resistor
S Control signal
t Discharge time of the intermediate circuit element
$t_E$ Maximum discharge time of the intermediate circuit element
T Temperature of the discharge element during the discharge process
$U_N$ Connection point of a voltage source
$U_S$ Wave-shaped sawtooth voltage
$V_{max}$ Maximum voltage of the intermediate circuit element
V(t) Intermediate circuit voltage

The invention claimed is:

1. An active discharge circuit for a vehicle discharge device for discharging a vehicle intermediate circuit, the discharge circuit comprising:
  a connector for connection to an intermediate circuit element of the vehicle intermediate circuit;
  a circuit arrangement connected in parallel to the connector and having a discharge element and a switching element, wherein the switching element is designed:
  to electrically contact the discharge element to the connector in a closed switching state; and
  not to electrically contact the discharge element to the connector in an open switching state; and a discrete discharge circuit, wherein the discrete discharge circuit is designed to adjust the switching states in the switching element by pulse-width modulation PWM during discharging of the intermediate circuit element;

wherein the discrete discharge circuit is designed to adjust the switching states at switching element as a function of an intermediate circuit voltage at the intermediate circuit element by PWM, wherein the discrete discharge circuit is designed to generate a wave-shaped sawtooth voltage, to compare the wave-shaped sawtooth voltage with the intermediate circuit voltage, and to output a PWM pulse to the switching element until the wave-shaped sawtooth voltage falls below the intermediate circuit voltage; and wherein the discrete discharge circuit has a plurality of sub-circuits connected in series, of which a first sub-circuit is an astable multivibrator, and of which a second sub-circuit, connected downstream of the first sub-circuit, is a charging circuit for charging and discharging a capacitor, wherein the multivibrator is designed to output voltage pulses as an output signal, and wherein the second sub-circuit is designed to output the wave-shaped sawtooth voltage with periodic discharge curves as an output signal.

2. An active discharge circuit for a vehicle discharge device for discharging a vehicle intermediate circuit, the discharge circuit comprising:

a connector for connection to an intermediate circuit element of the vehicle intermediate circuit;

a circuit arrangement connected in parallel to the connector and having a discharge element and a switching element, wherein the switching element is designed:

to electrically contact the discharge element to the connector in a closed switching state; and not to electrically contact the discharge element to the connector in an open switching state; and a discrete discharge circuit, wherein the discrete discharge circuit is designed to adjust the switching states in the switching element by pulse-width modulation PWM during discharging of the intermediate circuit element;

wherein the discrete discharge circuit is designed to adjust the switching states at switching element as a function of an intermediate circuit voltage at the intermediate circuit element by PWM, wherein the discrete discharge circuit is designed to generate a wave-shaped sawtooth voltage, to compare the wave-shaped sawtooth voltage with the intermediate circuit voltage, and to output a PWM pulse to the switching element until the wave-shaped sawtooth voltage falls below the intermediate circuit voltage; and wherein the discrete discharge circuit is designed to generate the wave-shaped sawtooth voltage with a waveform of a sawtooth, wherein the sawtooth wave periodically rises instantaneously from an initial value to a maximum value and subsequently decreases to the initial value in the form of an e-function.

3. The active discharge circuit according to claim 1, wherein a third sub-circuit, connected downstream of the second sub-circuit, is a non-inverting amplifier.

4. The active discharge circuit according to claim 3, further comprising a measuring element for measuring the intermediate circuit voltage at the intermediate circuit element and for outputting an intermediate circuit voltage measuring signal to the discrete discharge circuit, wherein a fourth sub-circuit, connected downstream of the second sub-circuit or downstream of the third sub-circuit, is a comparator circuit, wherein the comparator circuit is designed to compare the wave-shaped sawtooth voltage with the intermediate circuit voltage measuring signal and, as soon as the sawtooth voltage is greater than the intermediate circuit voltage measuring signal, to output a PWM pulse to the switching element.

5. The active discharge circuit according to claim 1, wherein the first sub-circuit is designed to output a square wave voltage having a high time and a low time to the second sub-circuit, and wherein the first sub-circuit has a capacity component connected to a connection point of a voltage source of the first sub-circuit and a resistor connected in series with the capacity component, and wherein the capacity component and the resistor are designed and connected such that the high time comprises a time interval in a range from $\frac{1}{6}$ to $\frac{1}{8}$ of a time interval of the low time.

6. The active discharge circuit according to claim 1, wherein the second sub-circuit has two resistors, a diode connected in a reverse direction, a diode connected in a forward direction, and a capacitor, wherein each resistor is connected in a series circuit with one respective diode, and the series circuits are connected in parallel, and wherein the resistor connected upstream of the diode connected in the reverse direction and the capacitor are designed to adjust a slope of the respective discharge curve of the output signal formed as a wave-shaped sawtooth voltage.

7. An active discharge circuit for a vehicle discharge device for discharging a vehicle intermediate circuit, the discharge circuit comprising:

a connector designed to connect to an intermediate circuit element of the vehicle intermediate circuit;

a circuit arrangement connected in parallel to the connector and having a discharge element and a switching element, wherein the switching element is designed:

to electrically contact the discharge element to the connector in a closed switching state; and not to electrically contact the discharge element to the connector in an open switching state;

a measuring device designed to measure an intermediate circuit voltage at the intermediate circuit element and to output an intermediate circuit voltage measuring signal; and a discrete discharge circuit arranged to receive the intermediate circuit voltage measuring signal from the measuring device, wherein the discrete discharge circuit is designed to: generate a wave-shaped sawtooth voltage;

compare the wave-shaped sawtooth voltage to the intermediate circuit voltage measuring signal; and adjust the switching states in the switching element by outputting a pulse-width modulation (PWM) pulse based on the comparison.

8. The active discharge circuit according to claim 7, wherein the discrete discharge circuit is designed to output the PWM pulse to the switching element in response to the wave-shaped sawtooth voltage being greater than the intermediate circuit voltage measuring signal.

9. The active discharge circuit according to claim 7, wherein the discrete discharge circuit is further designed to: compare the wave-shaped sawtooth voltage to an intermediate circuit voltage; and to output the PWM pulse to the switching element until the wave-shaped sawtooth voltage falls below the intermediate circuit voltage.

10. The active discharge circuit according to claim 7, wherein the discrete discharge circuit is designed to generate the wave-shaped sawtooth voltage with a waveform of a sawtooth.

11. The active discharge circuit according to claim 7, wherein the discrete discharge circuit has a plurality of sub-circuits connected in series, of which a first sub-circuit is an astable multivibrator, and of which a second sub-circuit, connected downstream of the first sub-circuit, is a charging circuit for charging and discharging a capacitor, wherein the multivibrator is designed to output voltage pulses as an output signal, and wherein the second sub-circuit is designed to output the wave-shaped sawtooth voltage with periodic discharge curves as an output signal.

12. The active discharge circuit according to claim 11, wherein a third sub-circuit, connected downstream of the second sub-circuit, is a non-inverting amplifier.

13. The active discharge circuit according to claim 12, wherein a fourth sub-circuit, connected downstream of the second sub-circuit or downstream of the third sub-circuit, is a comparator circuit, wherein the comparator circuit is designed to compare the wave-shaped sawtooth voltage with the intermediate circuit voltage measuring signal.

14. The active discharge circuit according to claim 11, wherein the first sub-circuit is designed to output a square wave voltage having a high time and a low time to the second sub-circuit, and wherein the first sub-circuit has a capacity component connected to a connection point of a voltage source of the first sub-circuit and a resistor connected in series with the capacity component, and wherein the capacity component and the resistor are designed and connected such that the high time comprises a time interval in a range from 1/6 to 1/8 of a time interval of the low time.

15. The active discharge circuit according to claim 11, wherein the second sub-circuit has two resistors, a diode connected in a reverse direction, a diode connected in a forward direction, and a capacitor, wherein each resistor is connected in a series circuit with one respective diode, and the series circuits are connected in parallel, and wherein the resistor connected upstream of the diode connected in the reverse direction and the capacitor are designed to adjust a slope of the respective discharge curve of the output signal formed as a wave-shaped sawtooth voltage.

16. A method for actively discharging a vehicle intermediate circuit with an active discharge circuit for a vehicle discharge device, wherein the active discharge circuit includes a connector designed to connect to an intermediate circuit element of the vehicle intermediate circuit;
 a circuit arrangement connected in parallel to the connector and having a discharge element and a switching element, wherein the switching element is designed to
  (a) electrically contact the discharge element to the connector in a closed switching state; and
  (b) not to electrically contact the discharge element to the connector in an open switching state;
 a measuring device; and
 a discrete discharge circuit, the method comprising:
 providing, via the measuring device, an intermediate circuit voltage measuring signal to the discrete discharge circuit;
 generating, via the discrete discharge circuit, a wave-shaped sawtooth voltage;
 comparing the wave-shaped sawtooth voltage to the intermediate circuit voltage measuring signal; and
 adjusting, via the discrete discharge circuit, the switching states in the switching element by outputting a pulse-width modulation (PWM) pulse based on the comparison.

17. The method according to claim 16, further comprising: comparing, via the discrete discharge circuit, the wave-shaped sawtooth voltage to an intermediate circuit voltage; and outputting, via the discrete discharge circuit, the PWM pulse to the switching element until the wave-shaped sawtooth voltage falls below the intermediate circuit voltage.

18. The method according to claim 16, further comprising outputting, via the discrete discharge circuit, the PWM pulse to the switching element in response to the wave-shaped sawtooth voltage being greater than the intermediate circuit voltage measuring signal.

* * * * *